Dec. 24, 1929.  A. R. KRAUSE  1,740,987
RIMMING PRESS
Filed Jan. 24, 1927.  2 Sheets-Sheet 2
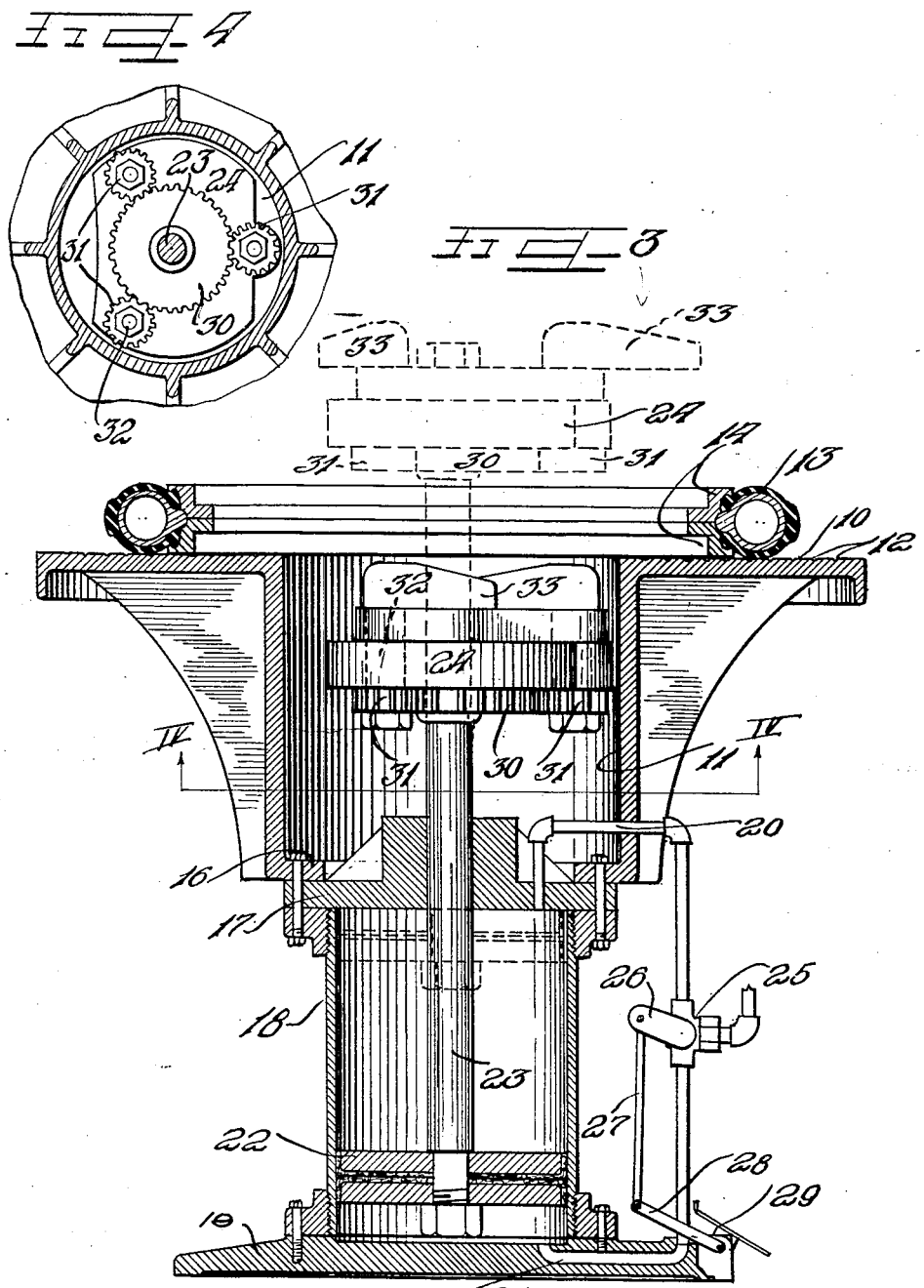
INVENTOR
Arnold R. Krause
BY Charles Hill
ATYS Patented Dec. 24, 1929

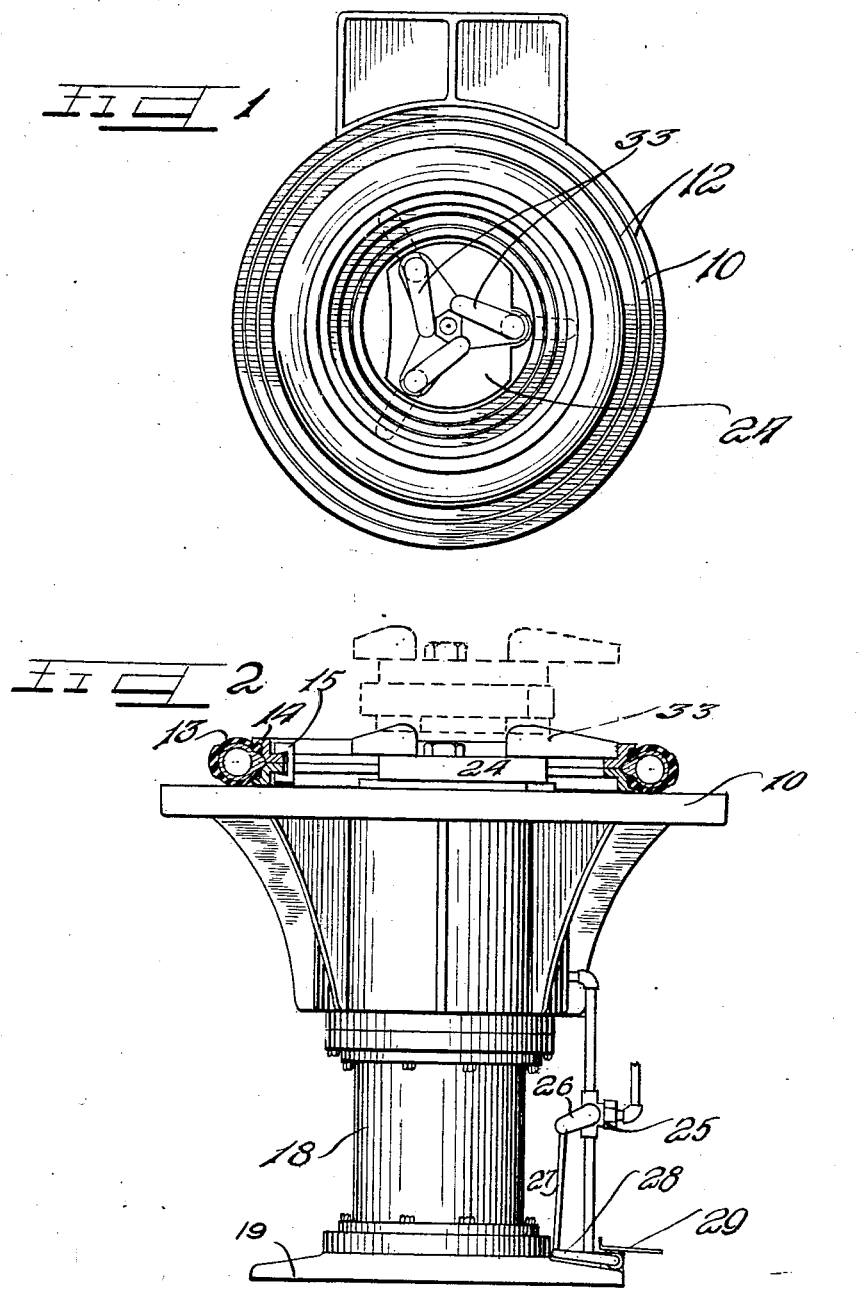

1,740,987

UNITED STATES PATENT OFFICE

ARNOLD R. KRAUSE, OF EAU CLAIRE, WISCONSIN, ASSIGNOR TO GILLETTE RUBBER COMPANY, OF EAU CLAIRE, WISCONSIN, A CORPORATION OF WISCONSIN

RIMMING PRESS

Application filed January 24, 1927. Serial No. 163,199.

This invention relates to a rimming press with special reference to mechanism for applying and compressing bead rims to pneumatic tires prior to insertion in the vulcanizing molds.

It is an object of this invention to provide means adjustable to various tire diameters for compressing bead forming rims or rings to facilitate clamping thereof on a tire carcass. The device is equally applicable to the compression or closing of the molds themselves, the separate bead forming rings being part of a specific tire building process that has been chosen for illustrative purposes.

It is another object of this invention to provide a clamping head adapted to be retracted below the table level and having simultaneously operable swiveled dogs the adjustment of any one of which adjusts the others to the same extent to maintain the tips of the dogs in a circle concentric with the axis of the clamping head. By so arranging the dogs the adjustment of the head for varying tire sizes is greatly facilitated and the dogs may be swung out of the way to retract the whole mechanism below the level of the table to permit the heavy and awkward tire assemblies to be shoved on and off the table without having to lift them over the clamping head.

Other and further important objects of this invention will be apparent from the disclosures in the drawings and specification.

This invention (in a preferred form) is illustrated in the drawings and hereinafter more fully described.

On the drawings:

Figure 1 is a top plan view of a device embodying the features of this invention.

Figure 2 is a side elevation thereof with a tire partly in section mounted thereon.

Figure 3 is a central section corresponding to Figure 2.

Figure 4 is a fragmentary detail section on the line IV—IV of Figure 3.

As shown on the drawings:

A circular table 10 is formed with a central aperture 11 for receiving the clamping mechanism, the table top being scored with concentric grooves 12 to facilitate aligning a tire carcass 13 therewith, the tire being assembled with an air bag and two bead forming rings 14 which are intended to be forced into engagement and secured by a number of clamps 15 one of which is shown in Figure 2.

The central aperture 11 in the table 10 is formed as a deep well like recess the bottom 16 of which is flanged and mounted on the cylinder head 17 of a fluid cylinder 18 mounted on the base 19, fluid connections 20 and 21 being provided in the head and base, respectively. A piston 22 is secured to the lower end of a piston rod 23 extending through a central aperture in the head 17, the upper end of the rod 23 carrying a clamping head 24 to be described hereinafter. The piston is moved in the cylinder 18 by selectively admitting an operating fluid under pressure through either of the pipes 20 or 21, the other of the pipes acting as a vent, and both pipes leading to a control valve 25 provided with an operating lever 26 and linkage 27 and 28 to a rocking foot pedal 29.

As best shown in Figure 4 a gear 30 is freely movable on the piston rod head beneath the clamping head 24, pinions 31 meshing therewith and being secured to the lower ends of clamping shafts 32 the upper ends of which carry lever dogs 33. By means of the above described gear and pinions, any one of the dogs may be grasped to swing it out to the proper base diameter to engage the surface of the bead rings or molds, the other dogs swinging to the same extent so that the tips of all the dogs always define a circle concentric with the piston rod and table grooves. Also any one of the dogs can be utilized to retract all the levers into the position shown in Figure 1 when the valve 25 can be operated to drop the clamping head into the recess 11 below the table top so that it will be easy to move a heavy tire mold onto or off the table.

In the operation of this device the clamping head is retracted below the table top and a tire with the bead rings added thereto, is centered on the table. Next, the clamping head is run up to its maximum height, as shown in dotted lines in Figure 2, and the dogs are swung out to the proper diameter by moving any one of them, after which the valve 25 is operated to force the clamping head downwardly until the dogs compress the upper bead ring into contact with its lower mating ring when a sufficient number of the clamps 15 are driven in place to hold the bead rings together until the assembly can be transferred into position in the vulcanizing molds proper; the clamping mechanism being released and retracted by reversing the above described steps.

I am aware that many changes may be made and numerous details of construction may be varied through a wide range without departing from the principles of this invention and I therefore, do not purpose limiting the patent granted hereon otherwise than necessitated by the prior art.

I claim as my invention:

In an apparatus for engaging bead clamping rings, a table having a substantially central tube, vertically movable arms associated therewith and movable through said tube, means to move said arms above and below the plane of the top of said table, said tube being disposed between said table and said means so as to support said table on said means, and means on the ends of the arms to engage the bead clamping rings and movable with said arms to a position below said plane of the table top so that the tire carcass can be slid on and off the table with facility, said means comprising a plurality of hooks rotatable into and out of effective bead engaging positions.

In testimony whereof I have hereunto subscribed my name.

ARNOLD R. KRAUSE.